(12) United States Patent
Peng et al.

(10) Patent No.: US 12,531,642 B1
(45) Date of Patent: Jan. 20, 2026

(54) SYSTEM AND METHOD FOR REAL-TIME RF FINGERPRINTING

(71) Applicant: The Trustees of Princeton University, Princeton, NJ (US)

(72) Inventors: Hsuan-Tung Peng, Princeton, NJ (US); Joshua Lederman, Princeton, NJ (US); Lei Xu, Priinceton Junction, NJ (US); Thomas Ferreira de Lima, Princeton, NJ (US); Chaoran Huang, Hong Kong (CN); David Rosenbluth, Swarthmore, PA (US); Paul Prucnal, Princeton, NJ (US)

(73) Assignee: THE TRUSTEES OF PRINCETON UNIVERSITY, Princeton, NJ (US)

( * ) Notice: Subject to any disclaimer, the term of this patent is extended or adjusted under 35 U.S.C. 154(b) by 741 days.

(21) Appl. No.: 17/896,251

(22) Filed: Aug. 26, 2022

Related U.S. Application Data

(60) Provisional application No. 63/237,223, filed on Aug. 26, 2021.

(51) Int. Cl.
  *H04B 17/309* (2015.01)
  *H04B 1/00* (2006.01)
  *H04B 17/391* (2015.01)

(52) U.S. Cl.
  CPC ......... *H04B 17/309* (2015.01); *H04B 1/0007* (2013.01); *H04B 17/3913* (2015.01)

(58) Field of Classification Search
  CPC . H04B 17/309; H04B 17/3913; H04B 1/0007
  See application file for complete search history.

(56) References Cited

U.S. PATENT DOCUMENTS

2017/0364744 A1* 12/2017 Savchenkov .... G06V 30/19167
2019/0311289 A1* 10/2019 Nguyen ............... G07C 5/0816

OTHER PUBLICATIONS

Tait, Alexander N. et al., "Silicon Photonic Modulator Neuron," Physical Review Applied, vol. 11, p. 064043, Jun. 2019.
(Continued)

*Primary Examiner* — Natasha W Cosme
(74) *Attorney, Agent, or Firm* — Meagher Emanuel Laks Goldberg & Liao, LLP

(57) ABSTRACT

A system and method may be provided for real-time RF fingerprinting, that includes obtaining residual data from each transmission via residual data preprocessing, processing at least a portion of the residual data using a photonic hardware-compatible continuous-time recurrent neural network (CTRNN) model to correlate temporal information and generate informative features, classifying the residual data based on the informative features using a convolutional neural network (CNN) model, and outputting a prediction of which of the plurality of devices at least one of the plurality of adjacent data units was transmitted from. The CNN model may be configured to convolute the generated informative features using at least one convolution-1D layer, for each of which it may select a maximum value for every two consecutive sequential points output from the convolution-1D layer using a max-pooling layer, and flatten and fully connect the output from a last max-pooling layer using a fully-connected layer.

11 Claims, 12 Drawing Sheets

(56) References Cited

OTHER PUBLICATIONS

De Lima, Thomas Ferreira et al., "Machine Learning With Neuromorphic Photonics," Journal of Lightwave Technology, vol. 37, No. 5, Mar. 1, 2019.

Tait, Alexander N. et al., "Neuromorphic photonic networks using silicon photonic weight banks," Scientific Reports, vol. 7, No. 1, p. 7430, Aug. 7, 2017.

Lechner, Mathias et al., "Neural circuit policies enabling auditable autonomy," Nature Machine Intelligence, vol. 2, pp. 642-652, Oct. 2020.

Huang, Chaoran et al., "Demonstration of photonic neural network for fiber nonlinearity compensation in long-haul transmission systems," 2020 Optical Fiber Communications Conference and Exhibition (OFC), pp. 1-3, 2020.

Kingma, Diederik P. and BA, Jimmy Lei. "Adam: A Method for Stochastic Optimization," 3rd International Conference on Learning Representations, ICLR 2015.

O'Shea, Timothy J. et al., "Convolutional Radio Modulation Recognition Networks," https://arxiv.org/pdf/1602.04105.pdf., Jun. 10, 2016.

Lechner, Mathias et al., "Neuronal Circuit Policies," https://arxiv.org/abs/1803.08554, Mar. 22, 2018.

Das, Rajshekhar et al., "A Deep Learning Approach to IoT Authentication," 2018 IEEE International Conference on Communications (ICC), pp. 1-6, 2018.

Yu, Jiabao et al., "A Robust RF Fingerprinting Approach Using Multisampling Convolutional Neural Network," IEEE Internet of Things Journal, vol. 6, No. 4, Aug. 2019.

Werbos, Paul J., "Backpropagation Through Time: What It Does and How to Do It," Proceedings of the IEEE, vol. 78, No. 10, pp. 1550-1560, Oct. 1990.

Merchant, Kevin et al., "Deep Learning for RF Device Fingerprinting in Cognitive Communication Networks," IEEE Journal of Selected Topics in Signal Processing, vol. 12, No. 1, pp. 160-167, Feb. 2018.

Jian, Tong et al., "Deep Learning for RF Fingerprinting: A Massive Experimental Study," IEEE Internet of Things Magazine, vol. 3, pp. 50-57, Mar. 2020.

Merchant, Kevin and Nousain, Bryan, "Enhanced RF Fingerprinting for IoT Devices with Recurrent Neural Networks," 2019 IEEE Military Communications Conference (MILCOM), pp. 590-597, 2019.

He, Kaiming et al., "Delving Deep into Rectifiers: Surpassing Human-Level Performance on ImageNet Classification," 2015 IEEE International Conference on Computer Vision (ICCV), pp. 1026-1034, 2015.

Chen, Songlin et al., "Identification of Wireless Transceiver Devices Using Radio Frequency (RF) Fingerprinting Based on STFT Analysis to Enhance Authentication Security," 2017 IEEE 5th International Symposium on Electromagnetic Compatibility (EMC-Beijing), pp. 1-5, 2017.

Youssef, Khalid et al., "Machine Learning Approach to RF Transmitter Identification," IEEE Journal of Radio Frequency Identification, vol. 2, No. 4, pp. 197-205, Dec. 2018.

Tait, Alexander N. et al., "Microring Weight Banks," IEEE Journal of Selected Topics in Quantum Electronics, vol. 22, No. 6, p. 5900214, Nov./Dec. 2016.

Paszke, Adam et al., "PyTorch: An Imperative Style, High-Performance Deep Learning Library," 33rd Conference on Neural Information Processing Systems (NeurIPS), 2019.

Tait, Alexander N. et al., "Multi-channel control for microring weight banks," Optics Express, vol. 24, No. 8, pp. 8895-8906, Apr. 2016.

Nahmias, Mitchell A. et al., "Photonic Multiply-Accumulate Operations for Neural Networks," IEEE Journal of Selected Topics in Quantum Electronics, vol. 26, No. 1, p. 7701518, Jan./Feb. 2020.

Merchant, Kevin and Nousain, Bryan, "Securing IoT RF Fingerprinting Systems with Generative Adversarial Networks," 2019 IEEE Military Communications Conference (MILCOM), pp. 584-589, 2019.

Glorot, Xavier and Bengio, Yoshua, "Understanding the difficulty of training deep feedforward neural networks," International Conference on Artificial Intelligence and Statistics, 2010.

Giefers, Heiner et al., "Measuring and Modeling the Power Consumption of Energy-Efficient FPGA Coprocessors for GEMM and FFT," Journal of Signal Processing Systems, vol. 85, pp. 307-323, 2016.

Gezici, Sinan, "A Survey on Wireless Position Estimation," Wireless Personal Communications, vol. 44, pp. 263-282, 2008.

"PYNQ-Z1: Python Productivity for Zynq-7000 ARM/FPGA SoC," FPGA hardware product produced by Xilinx, available online at https://digilent.com/shop/pynq-z1-python-productivity-for-zynq-7000-arm-fpga-soc/, accessed Jun. 28, 2023.

"ZigBee pro layer pics and stack profile," 2014, available online at https://zigbeealliance.org/wp-content/uploads/2019/11/docs-05-3474-21-0csg-zigbee-specification.pdf, accessed Jun. 18, 2023.

Xilinx, "Vivado Design Suite User Guide: High-Level Synthesis," Jun. 24, 2015.

Lecunn, Yann et al., "Deep learning," Nature, vol. 521, pp. 436-444, May 28, 2015.

Merchant, Kevin and Nousain, Bryan, "Toward Receiver-Agnostic RF Fingerprint Verification", Conference: 2019 IEEE Globecom Workshops (GC Wkshps), Dec. 2019.

\* cited by examiner

SYSTEM AND METHOD FOR REAL-TIME RF FINGERPRINTING

CROSS-REFERENCE TO RELATED APPLICATIONS

This application claims priority to 63/237,223, filed Aug. 26, 2021, the entirety of which is incorporated by reference herein in its entirety.

STATEMENT REGARDING FEDERALLY SPONSORED RESEARCH OR DEVELOPMENT

This invention was made with government support under Grant No. HR0011-19-9-0049 awarded by the Defense Advanced Research Projects Agency (DARPA). The government has certain rights in the invention.

TECHNICAL FIELD

The present disclosure is drawn to radio frequency (RF) fingerprinting, and specifically to systems and methods capable of real-time RF fingerprinting.

BACKGROUND

RF fingerprinting is generally understood as a process for identifying a radio transmitter by the "fingerprint" that characterizes its signal transmission, where the fingerprint is generally hard to imitate. Such fingerprints can be useful in a variety of applications.

One application is security. IoT devices without consistent human possession can be highly vulnerable to authentication-related threats, such as spoofing attacks in which digital IDs are cloned. One optimal method of preventing such attacks involves identifying individual devices by their unique physical characteristics (due to manufacturing differences) in generating radio-frequency signals for transmission. The variations of the physical characteristics are statistical in nature, and introduce device specific signature to the transmitted RF signals, forming RF identification (RFID). The device signature is usually hidden by a much stronger signal that is carrying the information content of the transmission. Extracting the sparsely distributed and low signal-to-noise ratio feature and achieving high classification accuracy are the main challenge of RF fingerprinting.

Conventional RF fingerprinting techniques requires pre-existing knowledge of RF engineering and/or large deep neural networks (5-6 layers with 100K to 1M parameters) to process radio signals offline. Although these approaches have achieved noteworthy results in demonstrating the effectiveness of ML for RF signal processing and classifications, they face the significant challenges of implementation in real-time on the network edge and are not scalable due to the latency introduced by the digital electronic hardware and the large size of neural network architecture.

BRIEF SUMMARY

To avoid the challenges described above, a method for real-time radio frequency (RF) fingerprinting may be provided. The method may include capturing a plurality of RF transmissions from a plurality of devices, each transmission comprising a plurality of adjacent data units. The method may include obtaining residual data from each transmission via residual data preprocessing. The method may include processing at least a portion of the residual data using a photonic hardware-compatible continuous-time recurrent neural network (CTRNN) model to correlate temporal information and generate informative features. The method may include classifying the residual data based on the informative features using a convolutional neural network (CNN) model. The method may include outputting a prediction of which of the plurality of devices at least one of the plurality of adjacent data units was transmitted from. The CNN model may be configured to convolute the generated informative features using at least one convolution-1D layer. The CNN model may be configured to, for each convolution-1D layer, select a maximum value for every two consecutive sequential points output from the convolution-1D layer using a max-pooling layer. The CNN model may be configured to flatten and fully connect the output from a last max-pooling layer using a fully-connected layer. The CNN model may be configured to classify, based on the output from the fully-connected layer, which of the plurality of devices at least one of the plurality adjacent data units was transmitted from. In some embodiments, the CNN model may be implemented using a field programmable gate array (FPGA).

In some embodiments, the residual data preprocessing may include identifying separate packet transmissions by thresholding the amplitude difference the adjacent samples. In some embodiments, the residual data preprocessing may include aligning the beginning of each separate packet transmission with a fixed preamble, and identifying a packet transmission start and end. In some embodiments, the residual data preprocessing may include calculating a phase difference between a ground truth signal and a measured signal, beginning with the fixed preamble. In some embodiments, the residual data preprocessing may include running linear regression to identify a phase and frequency correction. In some embodiments, the residual data preprocessing may include decoding the transmission into a data bit stream using the phase and frequency correction. In some embodiments, the residual data preprocessing may include regenerating a ground truth signal using the decoded data bit stream. In some embodiments, the residual data preprocessing may include applying a frequency and phase offset to derive a reference. In some embodiments, the residual data preprocessing may include obtaining residual data by subtracting the captured transmission from the regenerated ground truth signal.

In some embodiments, a signal-to-noise ratio (SNR) of the captured transmission may be greater than 15 dB. In some embodiments, the method may include cancelling noise in the captured transmission prior to residual data preprocessing.

In some embodiments, the CTRNN model may be trained end-to-end with the convolution-1D layer, the max-pooling layer, and the fully-connected layer, using a back propagation through time (BPTT) algorithm. In some embodiments, the CTRNN model may be implemented on a photonic recurrent neural network (RNN), which comprises silicon modulator neurons and N-doped silicon micro-ring weights banks in a recurrent loop.

In some embodiments, an on-chip photonic RNN for real-time radio frequency fingerprinting may be provided. The on-chip photonic RNN may include an antenna connected to a software-defined-radio (SDR). The SDR may be configured to demodulate RF data received by the antenna. The SDR may also be configured to perform residual data processing to reshape and weight residual data from the demodulated RF data. The on-chip photonic RNN may include an input/output portion connected to the SDR. The input/output portion may include a digital-to-audio converter (DAC) and Mach-Zehnder Modulator (MZM) to convert output from the SDR to analog signal and modulate to an optical domain. The input/output portion may include a wavelength division multiplexer (WDM) configured to couple the output from the DAC and MZM to grating couplers via a v-groove fiber array. The on-chip photonic RNN may include a photonic RNN, which comprises silicon modulator neurons and N-doped silicon micro-ring weights banks in a recurrent loop. The photonic RNN may be configured to receive output from the v-groove fiber array, correlate temporal information, and generate informative features. The on-chip photonic RNN may include wavelength selective switches (WSS) configured to demultiplex output from the photonic RNN. The on-chip photonic RNN may include an analog-to-digital converter (ADC) that converts the demultiplexed output to a digital output. The on-chip photonic RNN may include a field programmable gate array (FPGA) configured to receive the digital output, and classify the residual data based on the informative features using a convolutional neural network (CNN) model.

DETAILED DESCRIPTION

Figure 1:
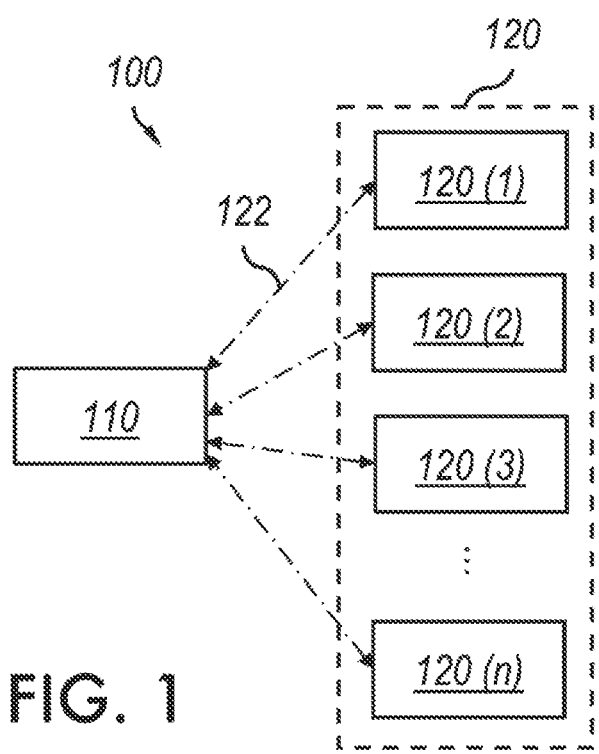
FIG. 1 is a simplified block diagram of a system.

Referring to FIG. 1, a simplified system in which RF fingerprinting may be useful is seen. In this system 100, a primary device 110 is communicating with one or more remote devices 120. The remote devices 120 may include multiple devices 120 (e.g., 120(1), 120(2), 120(3) . . . 120(n)) that are each sending transmissions 122 to the primary device. As will be understood in the art, the transmissions will generally be in the form of packets. Each packet may include, e.g., header bits and payload bits as understood by those of skill in the art.

A method for real-time RF fingerprinting may be provided. Such a method may be capable of identifying which of the remote devices 120 a particular transmission came from.

One example RF fingerprinting problem is as follows: data is collected and recorded at a sampling frequency of 16 MHz from each of 30 identical ZigBee Pro devices. The devices implement the full ZigBee Pro stack on top of the physical-layer specifications given in IEEE 802.15.4 standard, and the data has been downconverted to a complex baseband signal in a 32-bit floating point form. Can demodulated I/Q samples from the identical devices by classified, where each transmission includes 32 bytes of a random payload and 2 bytes checksum? As is understood in the art, "I/Q" is an abbreviation, where "I" refers to "in-phase" and "Q" refers to "quadrature". "In-phase" and "quadrature" refer to two sinusoids that have the same frequency and are 90° out of phase. By convention, the I signal is a cosine waveform, and the Q signal is a sine waveform.

Figure 2:
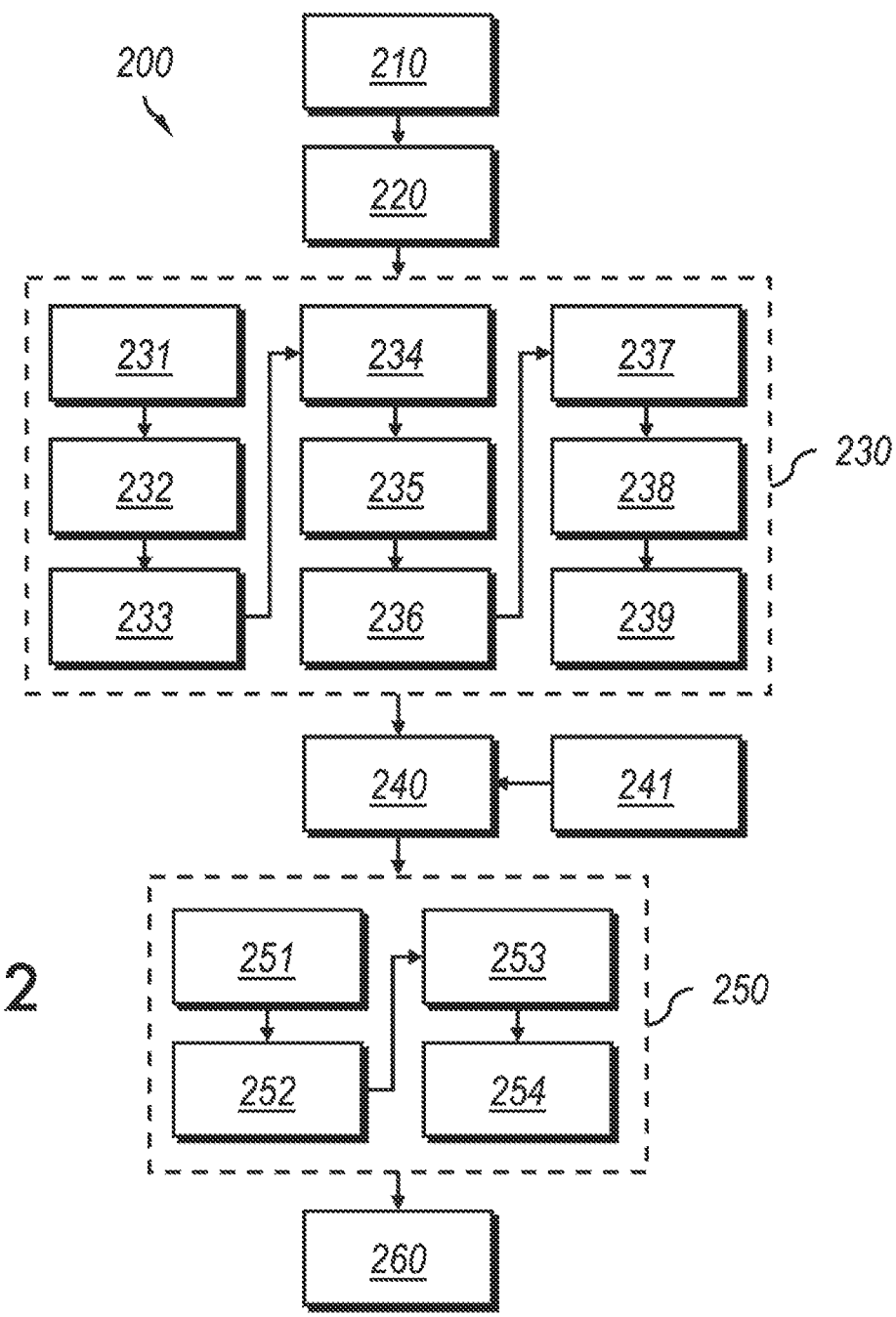
FIG. 2 is a flowchart of a method for real-time RF fingerprinting.

Referring to FIG. 2, in some embodiments, a method 200 may include capturing 210 a plurality of RF transmissions from a plurality of devices, where each transmission includes a plurality of adjacent data units.

In some embodiments, a signal-to-noise ratio (SNR) of the captured transmission may be greater than 15 dB. In some embodiments, the method may include cancelling 220 noise in the captured transmission. Cancelling noise may be used to, e.g., increase the SNR to above 15 dB.

The method may include obtaining 230 residual data from each transmission via residual data preprocessing.

The obtaining 230 of residual data from each transmission via residual data preprocessing may be performed using a variety of techniques.

The most substantial element of a signal not intrinsically associated with a device is the data that the device transmits. Therefore, the goal is to remove the data from the signal by reading the measured data, generating an ideal reference signal matching the data, and then subtracting the reference signal from the measured signal, leaving only nonidealities associated with each individual device. The following equation can be derived:

$$\omega_f t + \theta_f = \text{unwrap}(\phi_{ideal}(t) - \phi_{meas}(t)) \tag{1}$$

where $\phi_{ideal}$, $\phi_{meas}$ are the unwrap phases of the ideal signal and measured signal respectively, $\omega_f$ is the frequency correction term, $\theta_f$ is the phase correction term, and t represents time.

In some embodiments, one can begin with using preamble as an initial ideal reference data, and correct the original signal by applying the phase and frequency offset terms derived from linear regression. One can repeat this process until the decoder completes decoding the whole packet.

In some embodiments, the residual data preprocessing may include identifying 231 separate packet transmissions by thresholding the amplitude difference to/from the adjacent samples. In some embodiments, the residual data preprocessing may include aligning 232 the beginning of each separate packet transmission with a fixed preamble, and identifying 233 a packet transmission start and end. In some embodiments, the residual data preprocessing may include calculating 234 a phase difference between a ground truth signal and a measured signal, beginning with the fixed preamble. In some embodiments, the residual data preprocessing may include identifying 235 a phase and frequency correction by running a linear regression. In some embodiments, the residual data preprocessing may include decoding 236 the transmission into a data bit stream using the identified phase and frequency correction. In some embodiments, the residual data preprocessing may include regenerating 237 a ground truth signal using the decoded data bit stream. In some embodiments, the residual data preprocessing may include applying 238 a frequency and phase offset to derive a reference. In some embodiments, the residual data preprocessing may include obtaining 239 residual data by subtracting the captured transmission from the regenerated ground truth signal.

The method may include processing 240 at least a portion of the residual data using a photonic hardware-compatible continuous-time recurrent neural network (CTRNN) model to correlate temporal information and generate informative features.

In some embodiments, the method may include training 241 the CTRNN model end-to-end with a convolution-1D layer, a max-pooling layer, and a fully-connected layer, using a back propagation through time (BPTT) algorithm. In some embodiments, the CTRNN model may be implemented on a photonic recurrent neural network (RNN), which comprises silicon modulator neurons and N-doped silicon micro-ring weights banks in a recurrent loop.

In some embodiments, the method may include classifying 250 the residual data based on the informative features using a convolutional neural network (CNN) model.

The CNN model may be configured in a variety of ways. In some embodiments, the CNN model may be configured to convolute 251 the generated informative features using at least one convolution-1D layer (which may be a convolution-1D layer used to train the CTRNN model). The CNN model may be configured to, for each convolution-1D layer, select 252 a maximum value for every two consecutive sequential points output from the convolution-1D layer using a max-pooling layer (which may be a max-pooling layer used to train the CTRNN model). The CNN model may be configured to flatten and fully connect 253 the output from a last max-pooling layer using a fully-connected layer (which may be a fully-connected layer used to train the CTRNN model). The CNN model may be configured to classify 254, based on the output from the fully-connected layer, which of the plurality of devices at least one of the plurality adjacent data units was transmitted from.

In some embodiments, the method may include allowing access to an application or database based on the classification. In some embodiments, the method may include blocking or disregarding a request incorporated into the transmission based on the classification of that transmission.

In some embodiments, the CNN model may be implemented using a field programmable gate array (FPGA).

For the CTRNN-CNN model, in some embodiments, such as when the original residual data has 2 channels (I/Q), one can define each two bytes of transmission as a data unit for the classifier. When the original residual data has a total of 34 bytes, each transmission would have 17 data units, where each unit has the shape of (2,1024).

One can denote the n-th data unit of a transmission as $X_n = [X_n^i]$, $\forall i \in 0, 1, \ldots, 1023$, and $X_n^i = [I_i, Q_i]^T$ is the i-th sample in the data unit. To train the temporal data more efficiently, one can treat the consecutive 32 samples of each channel as features, and reshape the input from (2,1024) to (64,32).

The reshaped data unit can be represented as $Y_n = [Y_n^i]$, for $i \in 0, 1, \ldots, 31$, and $Y_n^i = [I_{32i}, I_{32i+1}, \ldots, I_{32i+31}, Q_{32i}, Q_{32i+1}, \ldots, Q_{32i+31}]^T$. The model will take each segment of data $Y_n$ at once, and output a log probability log $\vec{P}_n = \log[P_n^k]$, $\forall k \in 1, 2, \ldots, 30$, where $\log P_n^k = \log P(C_k|Y_n)$, and $C_k$ is the k-th transmitter.

The overall classification result is determined by the accumulated log probability of N data units of each transmission, i.e., $\log \vec{R} = \Pi_{n=1}^{N} \log \vec{R}_n$. Here, N can be chosen from 1,2, ..., 17, and when described in examples herein, one can use N=17.

For the CNN model, various CNN models may be utilized. In some embodiments, transmissions may be split into N non-overlapping segments of M consecutive samples, and a multi-layer convolutional neural network may be used to classify the transmission based on the accumulated results of each segment. CNN models capable of doing this are well-understood. See, e.g., Merchant et al., "Deep learning for rf device fingerprinting in cognitive communication networks", *IEEE Journal of Selected Topics in Signal Processing*, 12:160-167, 2018, the contents of which are incorporated by reference herein in its entirety.

In some embodiments, a modified version of the CNN proposed in Merchant may be used (e.g., modified for classification of n devices). In some embodiments, this approach achieved 85.54% accuracy. The network had 322,602 trainable parameters, and the same training method as proposed in Merchant was utilized. Table 1, below, shows the structure of multi-layer CNN used for classification of 30 Zigbee devices.

TABLE 1

(Multi-Layer CNN architecture for 30 devices calculation)

| Layer | Dimension (channel, length) | Parameters | Activation |
| --- | --- | --- | --- |
| Input | 2 × 1024 | — | — |
| Conv1D | 128 × 19 | 4992 | ELU |
| Max Pooling | — | — | — |
| Conv1D | 32 × 15 | 61472 | ELU |
| Max Pooling | — | — | — |
| Conv1D | 16 × 11 | 5648 | ELU |
| Max Pooling | — | — | — |
| Flatten | — | — | — |
| Fully Connected | 128 | 239744 | ELU |
| Dropout | — | — | — |
| Fully Connected | 64 | 8256 | ELU |
| Dropout | — | — | — |
| Fully-Connected | 30 | 1950 | Log Softmax |

This approach allows for a manageable size of input (2×1024) to CNN and achieve over 85% classification accuracy, but requires over 300 thousand training parameters. To improve this, rather than feeding all the samples to CNN classifier, CTRNN can be used to compress dimensions of the data, and send the more informative representations to a more compact CNN at the back end.

For the CTRNN model, various CTRNN models may be used. In some embodiments, in order to extract the temporal features in a transmission, the system needs to "read" and "memorize" the underlying signal for some amount of time and correlate the temporal information to generate informative features. The feedforward neural net-works lack this capability when applied to temporal data. Another issue with using feedforward neural networks for sequential data is the problem of vanishing gradients during back propagation training algorithm. Both of these problems are solved by the introduction of Recurrent Neural Networks (RNN). Therefore, a photonic hardware compatible CTRNN model is used at the front end to process the transmission data and send the learned features to CNN for classification.

The photonic CTRNN can be described by the following ordinary differential equation:

$$\tau\frac{ds}{dt} = -s(t) + W_{rec}y(t) + W_{in}x(t) + b, \quad (2)$$

$$y(t) = \sigma(s(t))$$

where s is the current injected to each of the silicon modulators, which is also defined as the state variable of the CTRNN, y is output optical signal from silicon modulator neurons, x is external input optical signal, $\tau$ is the RC constant of the photonic circuit, $W_{rec}$ is the photonic weights for recurrent signal, $W_{in}$ is the weight for input coupling, b is the constant bias, and $\sigma(\bullet)$ is the transfer function of silicon modulator neurons. To build a trainable CTRNN, one can approximate the above ODEs with the following formula:

$$\tau\frac{ds}{dt} = -s(t) + f(s(t), x(t), b), \quad (3)$$

$$s(t + \Delta t) = s(t) + \Delta s = s(t) + \frac{\Delta t}{T}(-s(t) + f(s(t), x(t), b),$$

$$f(s(t), x(t), b) = W_{in}x(t) + b_{in} + W_{rec}\sigma(s(t)) + b_{rec}$$

The state variable s is updated based on Equation 3. In some embodiments, it may be constructed using, e.g., a Pytorch nn.module. In other examples in this disclosure, $\Delta t/\tau$ is set as $\Delta t/\tau=0.5$, and an experimentally measured inverse-lorenztian function is used as the activation function $\sigma$.

Neural Network Architecture and Training Method

Figure 3:
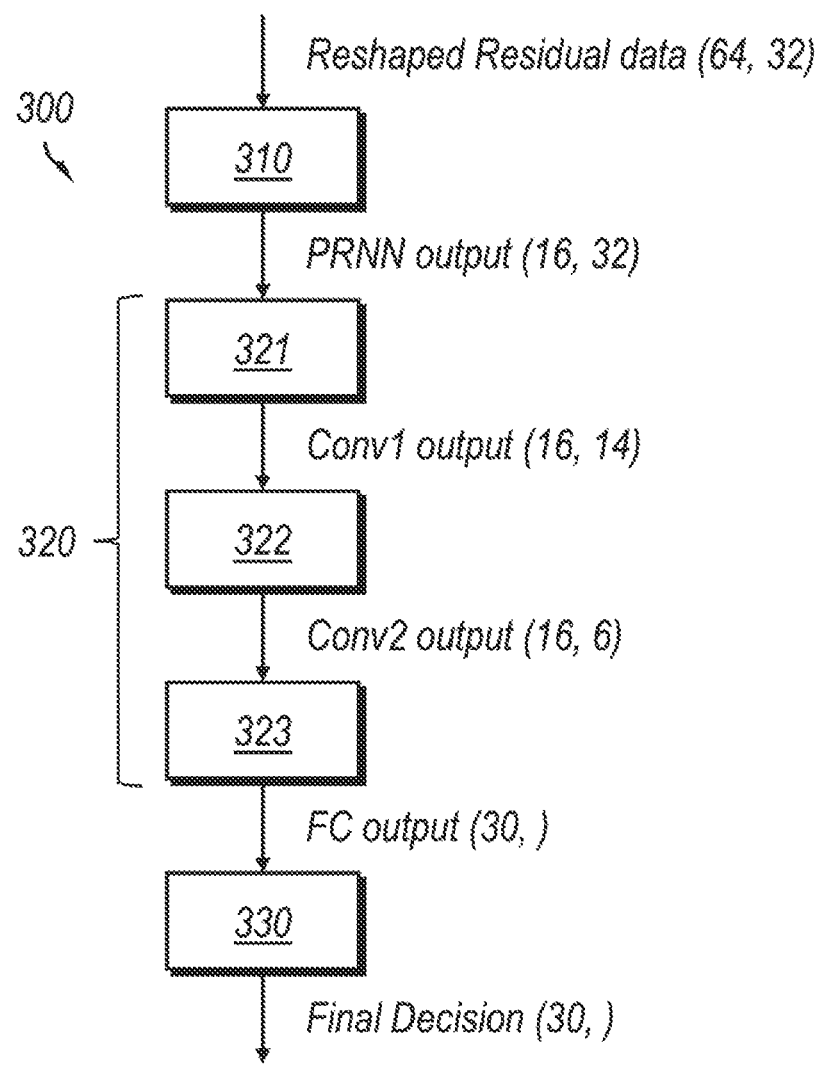
FIG. 3 is a block diagram showing a schematic of an embodiment of a disclosed CTRNN-CNN model for RF fingerprinting.

Referring to FIG. 3, an embodiment of the disclosed CTRNN-CNN 300 can be seen. The CTRNN-CNN consists of a CTRNN layer 310, and a CNN 320 with two Conv1D layers 321, 322 and one fully connected layer 323. The CTRNN layer may sometimes be referred to herein as a photonic-compatible RNN or "PRNN". The input data has 64 channels with length 32, and CTRNN has 16 neurons to generate 16 channels of output sequence. The output from CTRNN is sent to the first convolution-1D layer which has 16 filters with kernel size 5. After the first convolution, the data is convoluted by 16 filters with kernel size 3. The output of each convolution-1D layer is connected to a max-pooling layer. The max-pooling layer selects the maximum of the value for every two consecutive sequential points. The max-pooling layer are used for preventing overfitting and reducing the number of parameters of CNN. After the convolution layers 321, 322, the data is flattened and fully connected the 30 neurons are processed with log softmax activation function. The output shape after each layer is shown in FIG. 3, and the details of parameters of the model is given in Table 2, below. This architecture has 6302 parameters in total, which is 50 times fewer than the number of parameters used in the CNN model originally considered from Merchant. With the update equation provided in Equation 3, this CTRNN can be trained end-to-end with CNN model with back propagation through time (BPTT) algorithm.

In some embodiments, the training objective may be the negative log likelihood loss given by the output of the model and targeted label. In one example, an ADAM optimizer was used with an initial learning rate=0.0015. For each epoch, the model was trained with, e.g., the training dataset consisting of randomly shuffled 457963 data units and set the batch size to be 1700. The model was validated by measuring the accuracy of development dataset using N=17 segments of each transmission. If/when the accuracy does not increase in 10 consecutive epochs, the learning rate can be decreased by 50% and keep training until this happens three times.

TABLE 2

(PRNN assisted SEI architecture)

| Layer | Dimension (channel, length) | Parameters | Activation |
|---|---|---|---|
| I/Q Input | 2 × 1024 | — | — |
| Reshape | 64 × 32 | — | — |
| CTRNN | 16 × 32 | 1312 | Photonic act |
| Conv1D | 16 × 5 | 1296 | ELU |
| Max Pooling | — | — | — |
| Conv1D | 16 × 3 | 784 | ELU |
| Max Pooling | — | — | — |
| Flatten | — | — | — |
| Fully Connected | 30 | 2910 | Log Softmax |

Referring to FIG. 2, in some embodiments, the method may include outputting 260 a prediction of which of the plurality of devices at least one of the plurality of adjacent data units was transmitted from.

Example 1

After training and validation, the disclosed model's accuracy may be tested on a test dataset, which consists of 3292 transmissions. This model has reached 96.87%, which is over 10% higher than the complex CNN model previously proposed can provide. It is worth noting that at the test phase, when more data units of a transmission are used to produce accumulated probability, the high classification accuracy can be reached. This can be seen in FIG. 4. This can be seen in FIG. 4, which provides a graph indicate the accuracy levels reached based on the number of data units used.

For the rest of this example, N=17 segments will be used to evaluate the classification results. To analyze performance of fingerprint classifier under less than ideal conditions, additive datasets including Gaussian noise will be added to both I and Q channels to create variations to the input data. For simplicity, only a standard AWGN noise channel was implemented and simulated.

Figure 5:
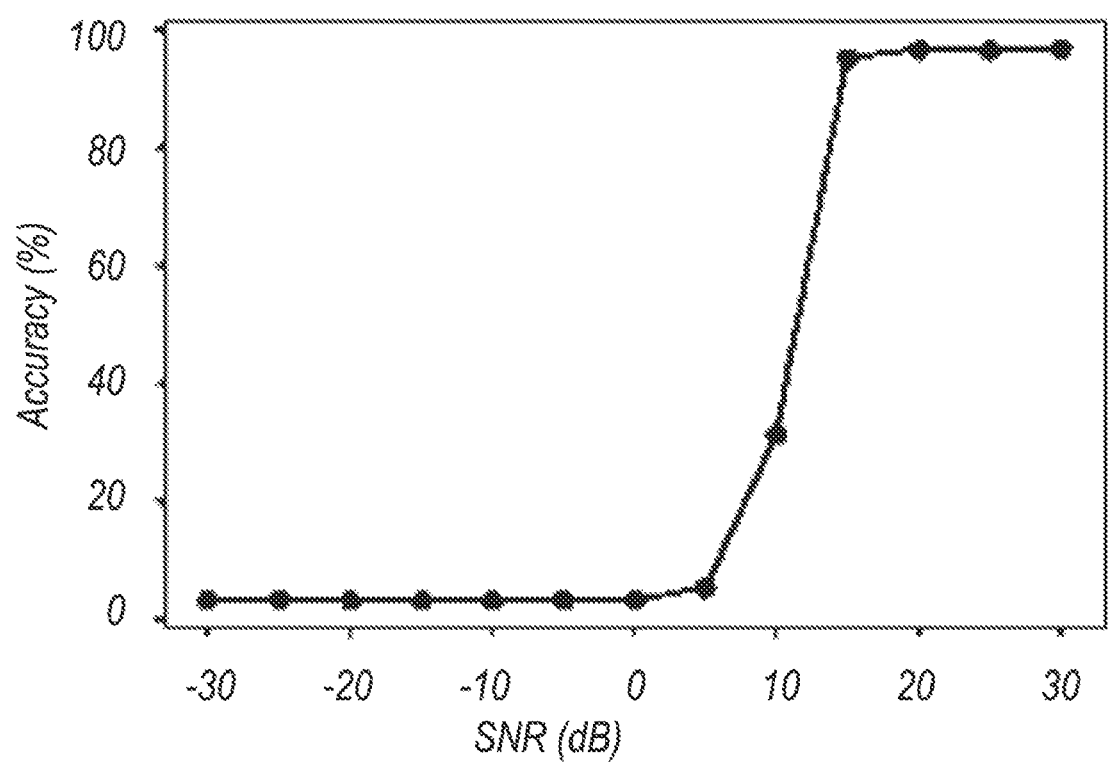
FIG. 5 is a graph showing classification accuracy on test dataset when Gaussian noise with SNR range from −30 to 30 dB is added, where the number of data units, N, is 17.
Figure 6:
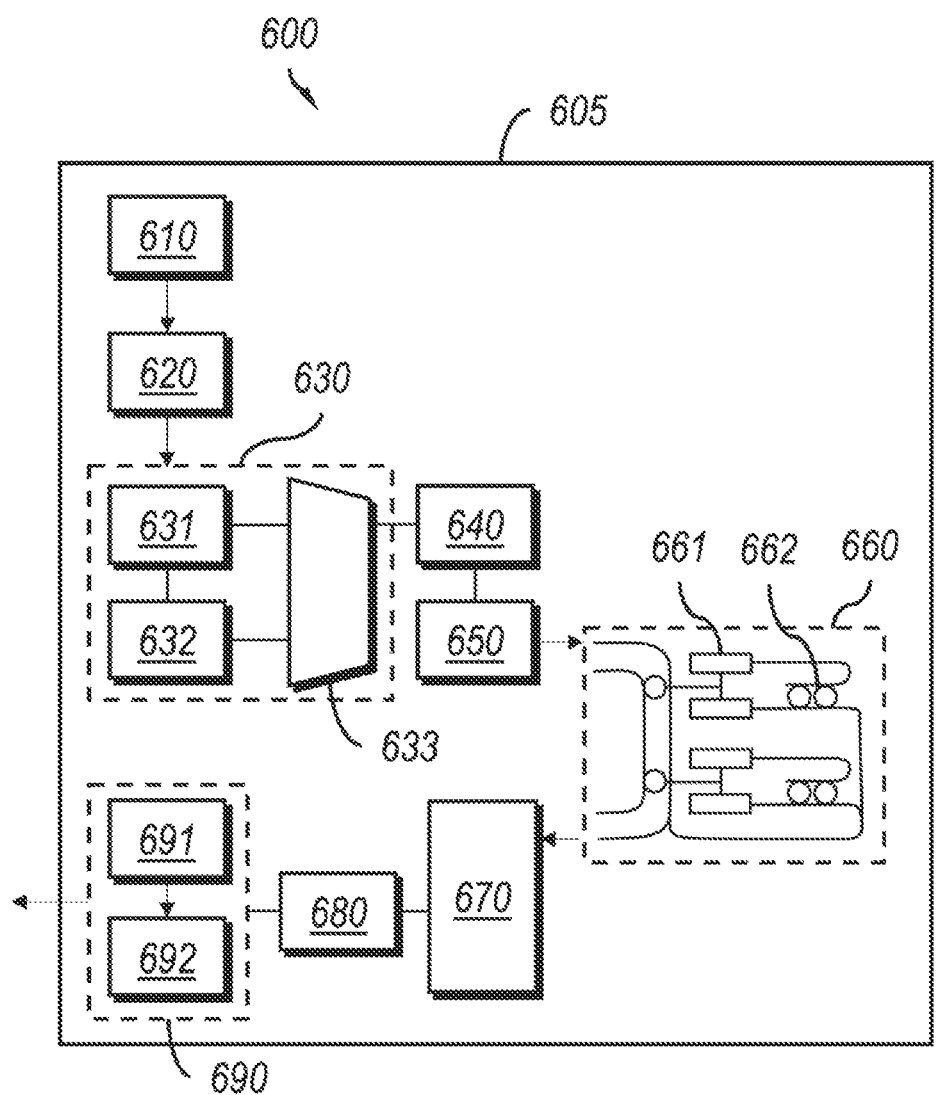
FIG. 6 is a block diagram showing a schematic of an on-chip photonic RNN.

As shown in FIG. 5, the classification accuracy stays above 95% when SNR is greater than 10 dB. The accuracy degrades when SNR is below at 10 dB.

To improve this robustness to noise, Lechner et al., "Neuronal circuit policies," ArXiv, vol. abs/1803.08554, 2018 (the entirety of which is incorporated by reference herein) suggests using a liquid time constant CTRNN model to adjust the decay time of each neurons based on input perturbation. This model has been shown to be more robust to noise in Lechner et al., "Neural circuit policies enabling auditable autonomy," *Nature Machine Intelligence, vol.* 2, pp. 642-652, 2020 (the entirety of which is incorporated by reference herein).

In some embodiments, an on-chip photonic RNN 600 for real-time radio frequency fingerprinting may be provided.

The on-chip photonic RNN may include an antenna 610 connected to a software-defined-radio (SDR) 620. The SDR may be configured to demodulate RF data received by the antenna. The SDR may also be configured to perform residual data processing to reshape and weight residual data from the demodulated RF data.

The on-chip photonic RNN may include an input/output portion 630 connected to the SDR. The input/output portion may include a digital-to-audio converter (DAC) 631 and Mach-Zehnder Modulator (MZM) 632 to convert output from the SDR to analog signal and modulate to an optical domain. The input/output portion may include a wavelength division multiplexer (WDM) 633 configured to couple the output from the DAC and/or MZM to grating couplers 650 via a v-groove fiber array 640. The on-chip photonic RNN may include a photonic RNN 660, which comprises silicon modulator neurons 661 and N-doped silicon micro-ring weight banks 662 in a recurrent loop. The photonic RNN may be configured to receive output from the v-groove fiber array, correlate temporal information, and generate informative features. The on-chip photonic RNN may include wavelength selective switches (WSS) 670 configured to demultiplex output from the photonic RNN. The on-chip photonic RNN may include a photodetector 680 and an analog-to-digital converter (ADC) 691 that converts the demultiplexed output to a digital output. The on-chip photonic RNN may include a field programmable gate array (FPGA) 692 configured to receive the digital output, and classify the residual data based on the informative features using a convolutional neural network (CNN) model.

Example (On-Chip Photonic Recurrent Neural Network)

The neural network was manufactured on a silicon photonic integrated circuit with high-speed optical ports coupled to a v-groove fiber array, and low-speed electric ports wired-bonded to an expander for configuration of optoelectronic devices. The neural non-linear activation is fully implemented on chip and is controllable and reconfigurable by biasing and sourcing current to silicon micro-ring modulators. The components of this silicon photonic neural network were described and individually demonstrated using the similar silicon photonics platform.

Figure 7:
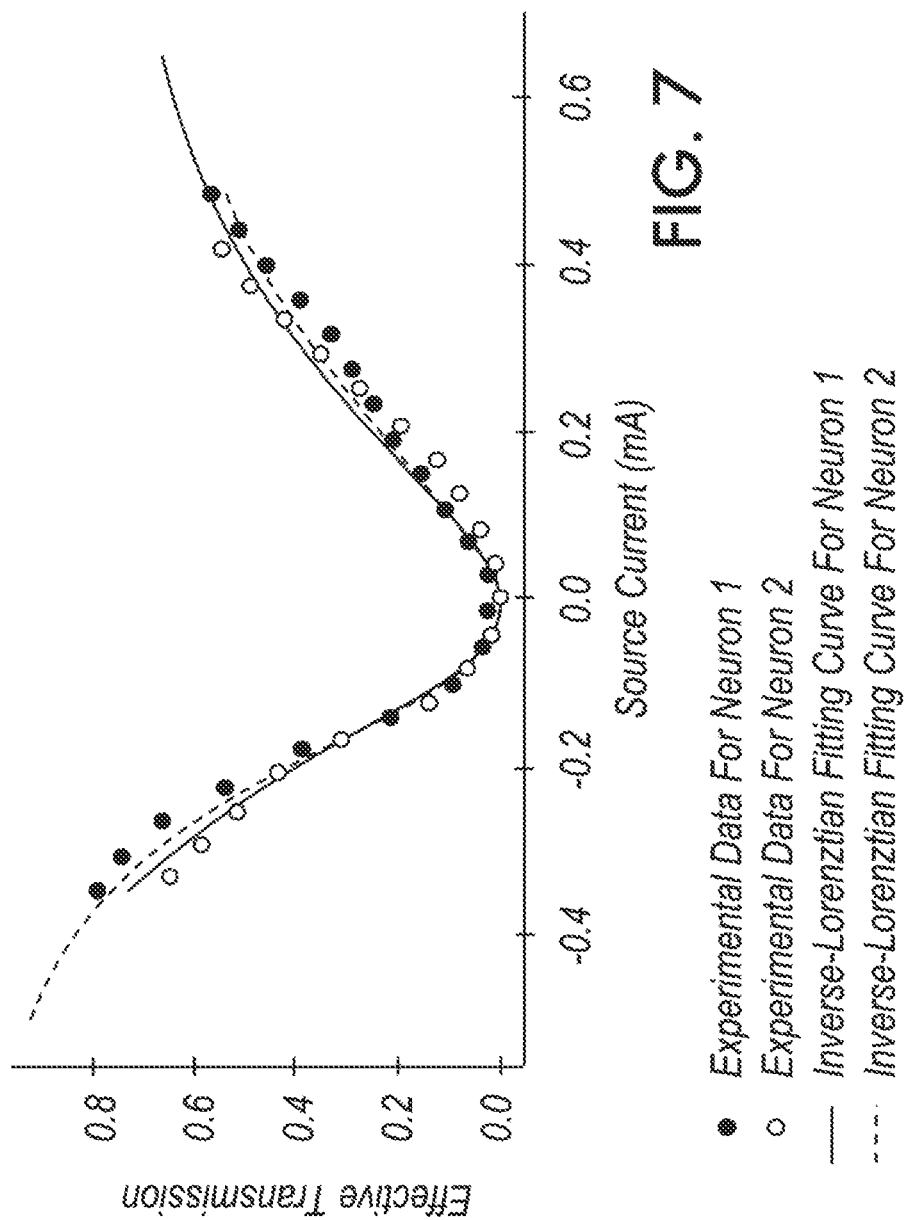
FIG. 7 is a graph showing experimental results of a transfer function of two silicon microring modulators on an on-chip photonic RNN. The circles in the figure are experimentally measured data. The lines are the fitting result using lorenztian type function $\sigma(s)=s^2/(s^2+(\alpha s+\beta)^2)$, with $\alpha=0.25$, $\beta=0.3$.

A Silicon Modulator Neuron. To build the CTRNN model for silicon photonic neural network, it was first needed to characterize the nonlinear activation function of silicon microring modulators. One can derive the transfer function by measuring the transmitted power of a continuous-wave laser (CW laser) and sweeping the current sourced to the modulator. The experimental results are given in FIG. 7. We define the current sourced to the modulator leading to the lowest transmission to be our bias current. With this definition, the transfer function of all the modulator neurons will have zero transmission when sourcing zero current. Then, we further fit the experiment data with Lorenztian type function. FIG. 7 shows that the transfer function is the same for different modulator neurons, and it matches with lorenztian type function very well, which can be modeled as $\sigma(s)=s^2/(s^2+(\alpha s+\beta)^2)$.

I/O photonic RNN: To interface RF fingerprinting data with the photonic RNN, DACs and MZMs may be used to convert input data to analog signal and modulated into optical domain. With a WDM system, the input data is coupled to the grating couplers on the silicon photonic chip via a v-groove fiber array. It is worth noting that the transmissions are collected by the antenna connected to a software-defined-radio (SDR) demodulating RF data and performing residual data processing. Before sending input residual data to photonic RNN, one can reshape and weight it by input coupling matrix $W_{in}$ digitally using a SDR. The output of photonic RNN is demultiplexed by wavelength selective switches (WSS), and detected by photonic detectors followed by ADCs converting signal to digital domain. Finally, the digital output will be sent to FPGA CNN for fast machine learning inference.

Hardware Performance Analysis

To evaluate the performance of the disclosed system, one can use, inter alia, two metrics: power consumption per inference and latency per inference. Furthermore, one can make a comparison between the disclosed, compact NN model in the hybrid hardware system, and the larger CNN model proposed in Merchant on FPGA. To effectively compare different processing approaches, one can assume that energy consumption scales linearly will the number of multiply-accumulate (MAC) operations required per inference, so that a given technology may be initially characterized by its energy per MAC operation. Similarly, one can first quantify latency per MAC operation, and then evaluate the minimum latency of the entire inference by identifying the minimum number of consecutive, dependent MAC operations required to complete the inference. One can assume, for the purpose of latency calculation, that an unlimited number of MAC operations may be computed in parallel so long as they are independent. In this evaluation, no consideration is given to any optimization to parallelize the dependent operations.

The primary source of power consumption in the silicon photonic systems are the microring heaters, which consume on the order of 1 mW of power, corresponding to 0.1 pJ/MAC for 10 GHz computation. Power consumption for a 56×56 matrix multiplication, including microring heaters, lasers, photodetectors, and amplification, is estimated at 0.22 pJ/MAC. See Nahmias, M. A. et al, "Photonic multiply-accumulate operations for neural networks," *IEEE Journal of Selected Topics in Quantum Electronics*, vol. 26, pp. 1-18, 2020, the entirety of which is incorporated by reference herein.

Neuromorphic photonics harnesses the properties of light to calculate at very high speeds. Photonic systems reach equilibrium within 100 ps of the inputs stabilizing, and their latency is restricted only by the capacity of their electrical control systems. On the other hand, modern FPGA designs typically have a maximum performance from among a variety of FPGA designs of 11.5 giga-OPS per Watt with 8-bit precision, or 0.17 nJ/MAC.

FPGA latencies depend on their clock speed, which reach a ceiling near 200 MHz. The per-MAC latency depends on a number of factors, including the precision of the operation, the level of pipelining of the design, and the clock frequency, but for simplicity one can assume only one clock cycle is required for an 8-bit precision MAC operation, for a total latency of 5 ns/MAC. Table 3, below, summarizes the performance/MAC for each disclosed processor

TABLE 3

(Comparison of Neural Interface Hardware)

| Hardware | Power | Latency |
| --- | --- | --- |
| FPGA | 170 pJ/MAC | 5 ns/MAC |
| SiPh NN | 0.22 pJ/MAC | 0.1 ns/MAC |

The disclosed RF fingerprinting approach includes two components: a photonic RNN and a CNN. In some embodiments, the photonic RNN modeled consisted of 1296 MAC operations at each time step. In some embodiments, there were 32 data points sent consecutively to the photonic RNN, it therefore required 32×1296=41472 total MAC operations resulting in 9.12 nJ/inference. For latency calculation, although the longest chain of dependent operations for each time-step has length of 16, the photonic broadcast-and-weight system perform these operations in parallel. Therefore, the overall latency for each inference is 0.1×32=3.2 ns/inference.

In some embodiments, the CNN consists of three layers with 47936 total MAC operations, and the longest chain of dependent operations may have a length of 128. It requires 0.17×47936=8149 nJ/inference, and 5×128=640 ns/inference on FPGA. This embodiment of the disclosed system therefore consumes 8.16 µJ/inference and has latency of 0.643 µs/inference. For the CNN model proposed by Merchant, it has total 40939392 MAC operations, and the longest chain of dependent operations has length of 455. If one uses the same FPGA to perform classification, then it requires power of 0.17×40939392≈6.9 mJ/inference, and latency of 5×455=2275 ns/inference. Table 4, below, shows the comparison of power and latency of the CNN from Merchant on FPGA, and the disclosed CTRNN-CNN on hybrid photonics/FPGA processor.

TABLE 4

(SEI Performance)

| Hardware Architecture | Power (µJ/ inference) | Latency (µs/ inference) |
|---|---|---|
| FPGA (Compact CNN) Silicon Photonic RNN | 8.15 0.009 | 0.64 0.003 |
| SiPh NN + FPGA (disclosed) | 8.159 | 0.643 |
| FPGA (Large CNN in Merchant) | 6900 | 2.275 |

Thus, in summary, the disclosed novel CTRNN-CNN model for RF fingerprinting achieves over 96% when SNR is greater than 15 dB, and the proposed model reduces the number of parameters by 50 times compared to the large CNN model proposed in Merchant. The hybrid system may comprising a photonic RNN to process sequential data with low latency, and a CNN on FPGA to enable massive parallel machine learning inference, which can be used to perform RF fingerprinting in real time.

Example 2

Residual Data Processing

The RF transmitters of the same type follow the same steps and communication protocols to process the transmitting bits by encoding, modulation, pulse shaping and up-conversion to generate the signals for transmission. Due to the electronic component's performance variations, the transmitted signals carry small and hidden information which is intrinsic to each individual transmitter. This example employs a residual data processing step, which extracts an error signal by subtracting the recovered data waveform from the received raw data waveform. The error signal, instead of the received raw data, is fed to the learning algorithm and neural networks for classification. Ideally, the error signal contains only residual signal elements directly associated with the intrinsic makeup of the transmitting device, rather than the transmitted bit information which the transmitters can change almost randomly.

The residual data processing, which serves as a pre-processing step before the neural network classification, removes the information data from the signal by recovering the measured data, generating an ideal signal matching this data, then subtracting the ideal signal from the measured signal, leaving only nonidealities associated intrinsically with each individual device. In order to generate the ideal signal, the measured signal is decoded then re-encoded.

Raw RF Data Settings

Radio frequency data was collected and measured from thirty ZigBee Pro devices operating at a central carrier frequency of 2.405 GHz, and a power level of 18 dBm. The data provided was downconverted to a complex baseband signal at 16 MHz in a 32-bit floating point form (4 bytes per value, or 8 bytes per complex sample). No further corrections had been applied to the data. In the following subsections Separating Out Transmissions Under the ZigBee protocol, a device broadcasts data separated into individual transmissions, each of which may be considered separately. These are sliced out by identifying large duration during which the signal is below a threshold, which separate transmissions.

Trimming and Synchronizing the Transmission

To be decoded correctly, transmissions must be aligned precisely, trimming off the start and end of the transmission to begin and end at the right sample. Each transmission begins with a fixed five bytes preamble, corresponding to four bytes of zeros and one byte equal to 0xA7. The beginning of the transmission may be identified by matching the signal corresponding to an ideal preamble to the measured signal. This is complicated by the fact that the initial phase of the signal is unknown. To avoid this issue, the discrete derivative of the phase of the complex ideal and measured signals were compared (unwrapped to avoid issues of phase jumping between $-2\pi$ and $2\pi$). This quantity may still be accurately matched to the preamble while being independent of the initial phase.

Mathematically to was determined such that the following quantity was minimized:

$$\sum_t \left\{ \frac{d}{dt}[\text{unwrap}(\angle x(t+t_0))] - \frac{d}{dt}[\text{unwrap}(\angle y(t))] \right\}$$

where $\angle x$ represents the phase of the measured signal and $\angle y$ the phase of the reference preamble, with the sum over the length of y.

Correcting Phase and Frequency Offsets

Data transmitted according to the ZigBee protocol is encoded using offset quadrature phase shift keying (O-QPSK). The signal has in-phase (I) and quadrature (Q) components which must be accurately separated.

The following model on the separation of the I and Q components is drawn from Merchant, with some adjustments and additions.

The data is encoded by the transmitter as a complex baseband signal ã(t), with time t. The transmitted signal b(t), with carrier frequency $\omega_c$ would then be:

$b(t) = \text{Re}[\tilde{a}(t)e^{i\omega_c t}]$

However, suppose the transmitter frequency and phase differs from the receiver frequency and phase. Modeling the difference as a phase offset $\phi_0$ and frequency offset $\omega_0$ at the transmitter side, the transmitted signal is then:

$$b(t)=\text{Re}[\tilde{a}(t)e^{i(\omega_c+\omega_0)t+\phi_0}]$$

The receiver measures the signal and downconverts it to a baseband signal $\tilde{c}(t)$, "removing" the carrier frequency $\omega_c$. In addition, there is a substantial attenuation in signal amplitude between the transmitter and receiver, represented by $\alpha$, and other phase distortion factors, small compared to the effect of $\omega_0$ and $\phi_0$, represented by $D(t)$. $D(t)$ includes elements associated with a device's unique wireless signature.

$$\tilde{c}(t)=\alpha\tilde{a}(t)e^{i(\omega_0t+\phi_0+D(t))}$$

The challenge is to extract $\tilde{a}(t)$ (or, more accurately, its phase for QPSK) from the measured $\tilde{c}(t)$ so that its effect may be subtracted out to produce the error signal, incorporating effects associated with $D(t)$. Let $\omega$ and $\phi$ represent the estimated phase and frequency correction, designed to compensate for $\omega_0$ and $\phi_0$. These are applied to the measured signal $\tilde{c}(t)$ to produce a corrected signal $\tilde{d}(t)$:

$$\tilde{d}(t)=\tilde{c}(t)e^{-i(\omega t+\phi)}$$

One will find $\omega$ and $\phi$ such that $\omega=\omega_0$ and $\phi=\phi_0$:

$$\tilde{d}(t)=\tilde{c}(t)e^{-i(\omega t+\phi)}=\alpha\tilde{a}(t)e^{i(\omega_0t+\phi_0+D(t))}=\alpha\tilde{a}(t)e^{iD(t)}$$

Representing $a(t)$ and $c(t)$ as quantities with amplitudes and phasis, the latter represented by $\phi_a(t)$ and $\phi_c(t)$, we have a phase equation:

$$\phi_c(t)-\omega t-\phi=\phi_a(t)+D(t)=\rightarrow\text{unwrap}(\phi_c(t)-\phi_a(t)=\omega t+\phi+D(t) \quad (4)$$

The function unwrap ( ) above means that the phase difference is unrolled, allowing it to increase past $\pi$ to $2\pi$, $3\pi$, $4\pi$ and so forth rather than circling back to $-\pi$.

Equation 4, in words: the phase difference between the measured signal $\tilde{c}(t)$ and the ideal signal $\tilde{a}(t)$ increases roughly linearly, with an initial phase offset $\phi$ and a slope corresponding to the frequency offset $\omega$. There is also a small deviation from this linear model, $D(t)$. If one has both the measured signal and an idea signal, linear regression may be used to estimate $\omega$ and $\phi$.

The fixed first five bytes of a transmission (the preamble) are used to generate an ideal reference signal matching the first five bytes of the measured transmission. Linear regression produces estimates of $\omega$ and $\phi$. In theory, these corrections may be applied to the measured signal $\tilde{c}(t)$ to produce $d(t)$, which may be decoded, as its I and Q components are appropriately separated.

Unfortunately, the estimates of the frequency offset $\omega$ based on the first five bytes of the signal are too imprecise. As time progresses, any slight inaccuracy in $\phi$ caused by the semi-random $D(t)$ builds up. Once the phase discrepancy at a certain point in time gets too high, the I and Q components of the signal will not be accurately separated and the decoder fails. Specifically, early in the transmission, the linear fit associated with the preamble correction is quite accurate. By the end of the transmission, the fit has drifted several radians from the phase difference.

A solution is to implement an iterative correction algorithm. The preamble correction is used to decode the signal up to the point that the decoder fails. The correctly decoded portion may then be used to generate a longer ideal signal and therefore a longer phase difference plot. Linear regression on this extended dataset produces more precise estimates of the phase and frequency offset, which in turn allow the measured signal to be more accurately corrected. This loop continues until the entire signal had been decoded, typically after 1-3 iterations following the preamble correction.

With the entire signal decoded, one has a corrected signal $d(t)$ and an idea signal corresponding to $\alpha\tilde{a}(t)$, the original ideal signal scaled to match the measured signal. The error signal $\tilde{e}(t)$ is then: $\tilde{e}(t)=d(t)-\alpha\tilde{a}(t)$.

In some embodiments, the entire process of residual data processing includes five steps: identification of packet transmissions, synchronization, decoding to get carrier frequency and phase offset, and bit stream of data, regeneration of a reference ground truth signal, and subtraction.

I/O Settings

In this example, the original residual data has 2 channels (I/Q) and a total of 34 bytes (17,408 samples). In the same manner as Merchant, one can define a two-byte segment of the transmission as the data unit for the classifier. As such, each transmission has 17 data units, where each unit is a two-channel time series with 1,024 steps.

One can denote the n-th data unit of a transmission as $Z_n=[Z_n^0, \ldots, Z_n^i, \ldots, Z_n^{1023}]$, $\forall i \in 0, 1, \ldots, 16$. Here, at each time step, $Z_n^i=[I_n^i, Q_n^i]^T$ is the i-th sample in the data unit. One can treat the consecutive 32 samples of each channel as features and reshape the input from (2,1024) to (64,32).

The reshaped data unit can be represented as $$X_n=[X_n^0, \ldots, X_n^0, \ldots, X_n^{1023}],$$

$$X_n^i=[I_n^{32i}, I_n^{32i+1}, \ldots, I_n^{32i+31}, Q_n^{32i}, Q_n^{32i+1}, \ldots, Q_n^{32i+31}]^T, \forall i \in 0,1, \ldots, 31.$$

The model will take each segment of data $Y_n$ at once, and output a log probability $\log \vec{P}_n=\log[P_n^1, P_n^k, \ldots, P_n^{30}]$, $\forall k \in 1, 2, \ldots, 30$, where $\log P_n^k=\log P(C_k|X_n)$, and $C_k$ is the k-th transmitter. The overall classification result is determined by the accumulated log probability of N data units of each transmission, i.e., log $$\vec{P} = \sum_{n=1}^{N} \log \vec{P}_n.$$

In this example, N can be chosen from 1,2, ..., 17.

PRNN Model

The disclosed PRNN model is configured to extract the temporal features in a transmission and emulating this model on an FPGA to achieve real-time processing. In some embodiments, this RNN model can be further realized on a fully-integrated photonic neural network to improve the latency of the RF fingerprinting system.

The dynamics of a photonic recurrent neural network can be described by the following equation:

$$\frac{d\vec{s}}{dt} = \frac{-\vec{s}}{\tau} + W\vec{y}(t) \quad (5)$$

$$\vec{y}(t)=\sigma(\vec{s}(t)) \quad (6)$$

where $\vec{s}$ is the neuron's state, $\vec{y}$ is output signal, $\tau$ is the time constant of the photonic circuit, W is the photonic weight, and $\sigma(\cdot)$ is the transfer function of the silicon photonic modulator neurons. It is worth noting that the nonlinear transfer function can be expressed as Lorentzian function, $\sigma(x)=x^2/(x^2+(ax+b)^2)$, where a, b are constants.

Figure 8:
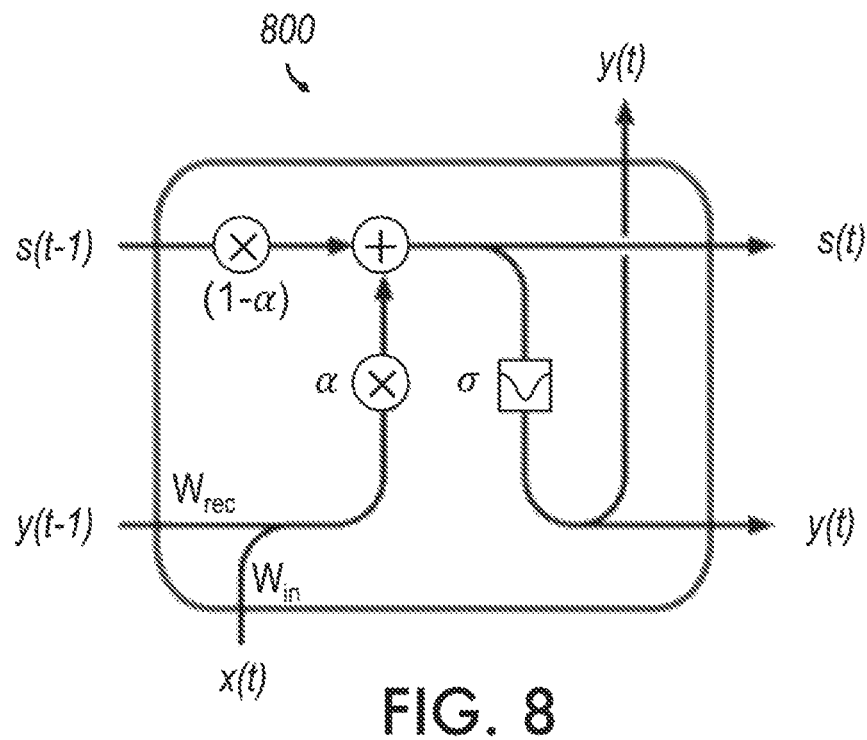
FIG. 8 is a schematic of a discrete photonic RNN cell, where $\alpha=\Delta t/\tau$.

More generally, we can add an external input signal $\vec{x}(t)$ to the photonic RNN, and the dynamical equation become:

$$\tau \frac{d\vec{s}}{dt} = -\vec{s} + f(\vec{s}, \vec{x}, \vec{\theta}), \quad (7)$$

$$f(\vec{s}, \vec{x}, \vec{\theta}) = W_{in}\vec{x}(t) + W_{rec}\sigma(\vec{s}(t)) + \vec{b}$$

where $\theta$ represents the trainable parameters for the network such as the bias $\vec{b}$, the recurrent photonic weight $W_{rec}$, and the input weight $W_{in}$. In this example, one can approximate the dynamical equation in Eq. 7 using the forward-Euler method and use this discrete version of dynamics to construct the photonic RNN (PRNN) cell 800 shown in FIG. 8 and implement it on an FPGA. The PRNN dynamics can be expressed by the following formula:

$$\tau \frac{d\vec{s}}{dt} = -\vec{s} + f(\vec{s}, \vec{x}, \vec{\theta}) \Rightarrow \vec{s}(t + \Delta t) = \vec{s}(t) + \Delta \vec{s}(t) + \frac{\Delta t}{T}(-\vec{s} + f(\vec{s}, \vec{x}, \vec{\theta})), \quad (8)$$

$$= \left(1 - \frac{\Delta t}{T}\right)\vec{s}(t) + \frac{\Delta t}{T}f(\vec{s}(t), \vec{x}(t), \vec{\theta}),$$

$$= (1 - \alpha)\vec{s}(t) + \alpha f(\vec{s}(t), \vec{x}(t), \vec{\theta})$$

where $\alpha = \Delta t/\tau$. The state variable s is updated based on Equation 8 and can be constructed using, e.g., a Pytorch nn.module. For the rest of the example, $\Delta t/\tau$ is set equal to 0.5, and an experimentally measured transfer function of a photonic neuron, $\sigma(x) = x^2/(x^2 + (0.3 + 0.25x)^2)$, is used.

Figure 10:
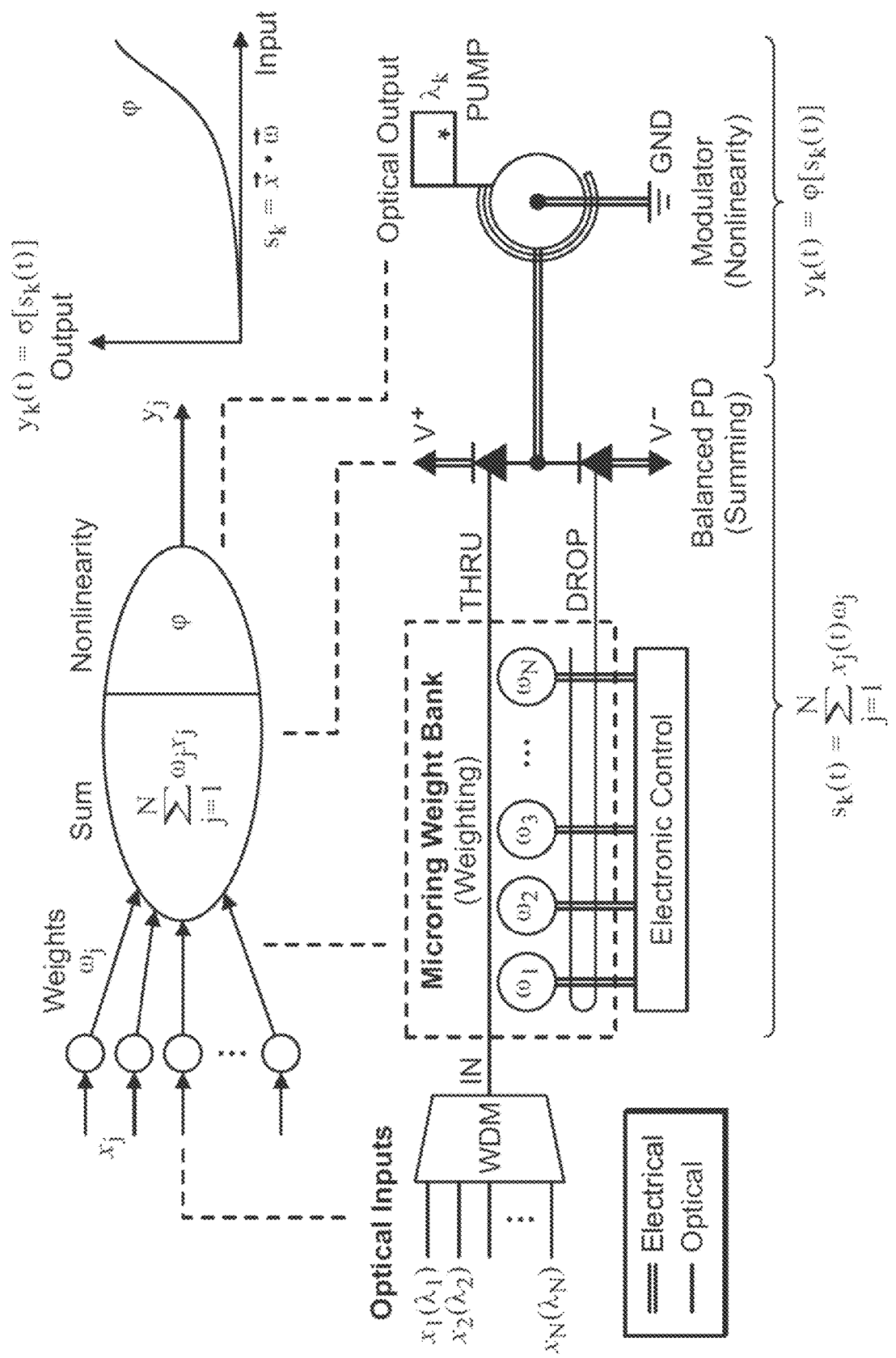
FIG. 10 is an illustration of a mathematical abstraction of neuronal function and silicon photonics implementation.

Neural Networks on Silicon Photonic Integrated Circuits
Mapping Neuronal Function on Silicon Photonic Integrated Circuits In this example, the PRNN cell (see, e.g., FIG. 8) is inspired by silicon photonic neural networks. The neural information processing of each neuron can be decomposed into four parts: (1) input signals receiving, (2) independent weighting of inputs, (3) summation, and (4) nonlinear transformation. These operations can be mapped and implemented on a silicon photonic integrated circuit as shown in FIG. 10. The input signals are encoded in the power of the optical sources. Each optical input has a unique wavelength to represent the signal from a different pre-synaptic neuron. These signals are multiplexed through wavelength-division multiplexing (WDM) to an optical fiber, which is then coupled to an on-chip waveguide. The weighting is implemented using a set of silicon micro-ring resonators (MRR). See, e.g., Tait, A. N. et al., "Microring weight banks", *IEEE Journal of Selected Topics in Quantum Electronics*, 22 (6): 312-325, November 2016. ISSN 1077-260X. doi: 10.1109/JSTQE.2016.2573583, and Tait, A. N. et al, "Multi-channel control for microring weight banks", *Optics Express*, 24 (8): 8895-896 April 2016. doi: 10.1364/OE.24.008895, both of which are incorporated by reference herein in their entirety.

Each of the micro-ring resonators is designed to resonate with each input wavelength and control its weight independently by fine tuning the resonance to change the transmission. The weighted optical signals are summed by balanced photodetectors (BPDs), which linearly transform the sum of the optical signals to photocurrent. The photocurrent is then sent to a silicon micro-ring modulator (MRM) as input to a neuron. It is worth noting that the weights are in the range of [−1,1], so usually an electrical amplifier such as a transimpedance amplifier (TIA) will be added to scale up the weighted value. Due to the carrier-induced nonlinear effect, a MRM will provide the nonlinear activation to the optical pump signal. This mechanism shows the working principal of a neuron node on a silicon photonic circuit. The optical output of the MRM can be further sent to other photonic neuron nodes to form a network system.

Implementation of a PRNN Node

Figure 11:
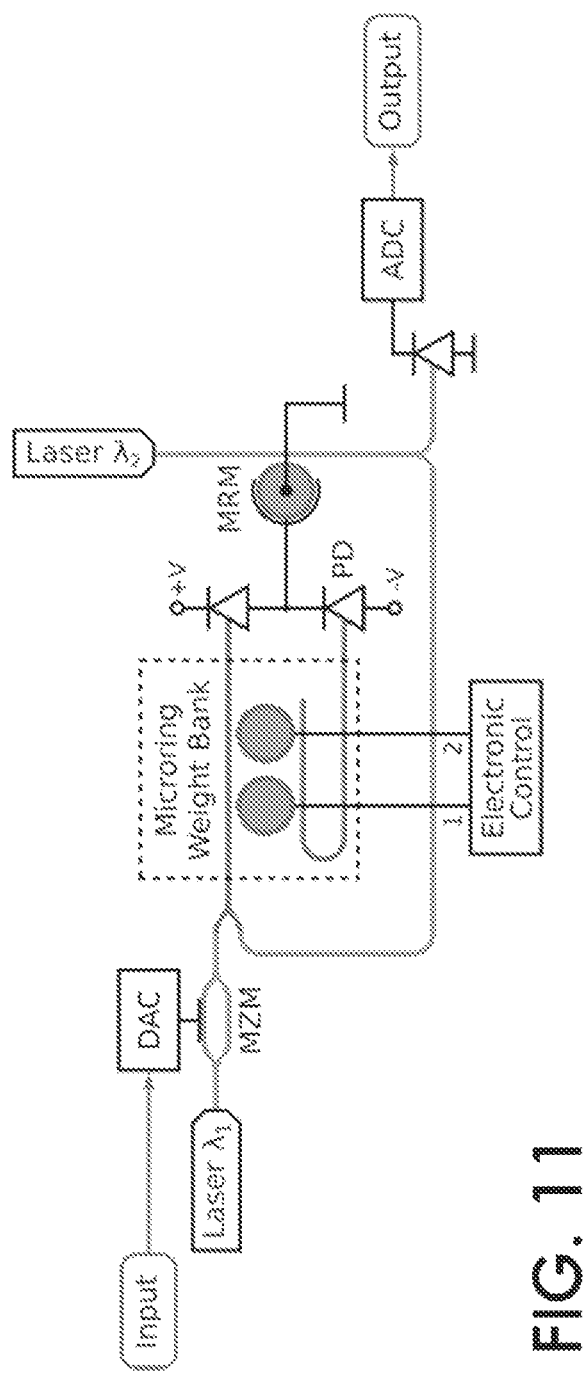
FIG. 11 is a schematic of a photonic RNN node implemented with microring resonators. DAC: digital-to-analog converter, ADC: analog-to-digital converter, MZM: Mach-Zehnder modulator, PD: photodetector, MRM: microring modulator.

In FIG. 11, one can see a basic architecture of an embodiment of a recurrent circuit of a silicon photonic neuron with MRR and MRM. To implement this PRNN node, one would convert the input digital data to an analog signal that drives a Mach-Zehnder modulator to generate an input signal in the optical domain with wavelength $\lambda$. Each of the MRRs has a different transmission coefficient for optical signals at different wavelengths. After passing the MRR weight bank, the optical signal is converted to an electrical signal that drives a micro-ring modulator to modulate the continuous-wave laser at wavelength $\lambda_2$. The $\lambda_2$ optical signal carrying the weighted information of the input signal is fed back to the MRR bank to form an RNN node. The dynamics of this system is the same as Eq. 7, and the RNN terminology and photonics equivalent are given in Table 5, below.

TABLE 5

(RNN terminology and photonics equivalent)

| RNN Terminology | | Photonic Equivalent |
|---|---|---|
| $\tau$ | Time constant of post-synaptic node | RC time constant of the link between BPDs and MRM |
| y | Output of post-synaptic node | Normalized output optical power of MRM |
| Win | Input weight matrix | MRR weights associated with input wavelengths |
| Wrec | Recurrent weight matrix | MRR weights associated with output wavelengths |
| $\sigma(x)$ | Nonlinear activation function | Nonlinear transfer function of MRMs |
| $\vec{b}$ | Bias of pre-synaptic node | DC current injected to MRM |

Neural Network Architecture and Experimental Settings

Figure 9:
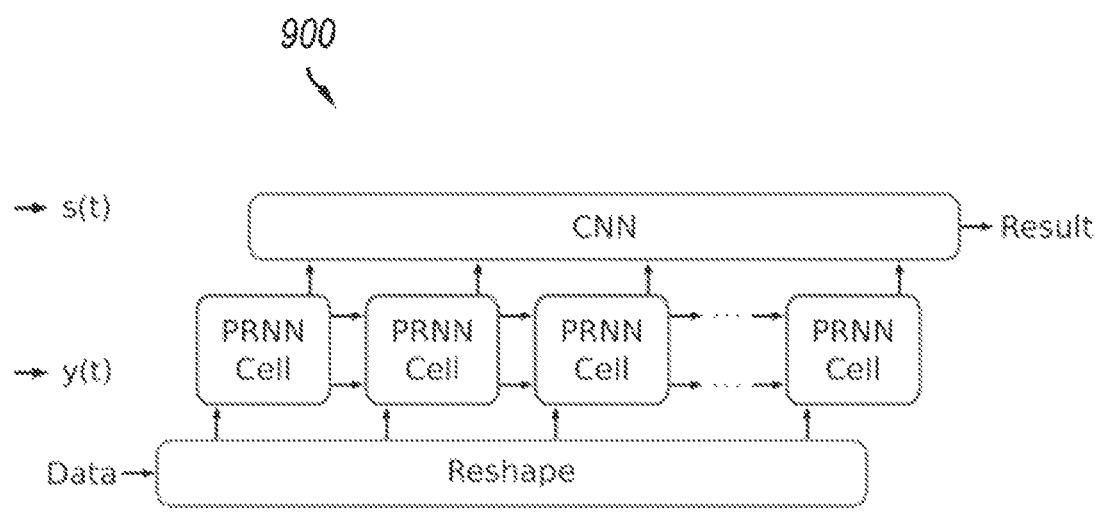
FIG. 9 is a schematic of connecting a photonic RNN to a CNN classifier for a time series classification task.

In this example, an RF fingerprinting system is used that includes a PRNN layer with PRNN unit cells and a CNN with two Conv1D layers and one fully connected layer. The system 900 is shown in FIG. 9. The input data has 64 channels with length 32, and the PRNN has 16 neurons to generate 16 channels of output sequence. The output $\vec{y}(t)$ from the PRNN is then sent to the convolutional layers. The system will then flatten the output of the convolutional layers and connect it to the fully-connected layer with 30 neurons and a log softmax activation function. The details of the parameters of the model are given below.

Neural Network Classifiers for RF Fingerprinting

In Merchant, a multi-layer convolutional neural network to classify the transmission of 7 identical ZigBee devices was proposed. Here, the same structure CNN is used, but for classification of 30 devices. The network has 322,602 trainable parameters, and Table 1 shows the structure of multi-layer CNN used for classification of 30 Zigbee devices.

In this CNN, aside from the last layer which has a log softmax nonlinearity, all the layers use the exponential linear unit as their activation function, which has the following nonlinearity:

$$ELU(x) = \begin{cases} x, & \text{if } x > 0 \\ \alpha(\exp(x) - 1), & \text{if } x \le 0 \end{cases}$$

In this example, the hyperparameter α was set to 1.

The details of the example PRNN-CNN architecture are shown in Table 2. In the PRNN layer, the nonlinear activation function is a Lorentzian function, which is designed to match the nonlinear transfer function of a silicon photonic modulator.

This architecture has 6,302 parameters in total, which is 50 times fewer than the number of parameters used in the model proposed in Merchant. With the update equation provided in Equation 8, this PRNN can be trained end-to-end with the CNN model and with a back propagation through time (BPTT) algorithm. In this example, the training objective is the negative log likelihood loss given by the output of the model and targeted label. Glorot uniform initialization was used for initialization of all convolutional and dense layers, and Kaiming initialization was used to initialize the parameters of PRNN layer. An ADAM optimizer was used with an initial learning rate of 0.001. For each epoch, the model was trained with a training dataset consisting of randomly shuffled data units and set the batch size to be 1,700. The model was validated by measuring its accuracy on the development dataset using N=17 segments of each transmission. When the classification accuracy on the development dataset doesn't increase in 10 consecutive epochs, the learning rate was decreased by 50% and training continued until 100 epochs.

FPGA Implementation

In this example, a PRNN-CNN model as disclosed herein with 6.3k trained parameters to an FPGA to demonstrate RF fingerprinting in real-time. The PRNN-CNN classifier was implemented on a low-cost PYNQ-Z1 FPGA board, chosen to demonstrate the hardware and cost minimization opportunities offered by the compact model. The FPGA design was created using the High-Level Synthesis (HLS) feature of the Vivado Design Suit, which allows a simplified C++ model of the design to be compiled first into a hardware description language format and then into a bitstream file for the FPGA.

Figure 12:
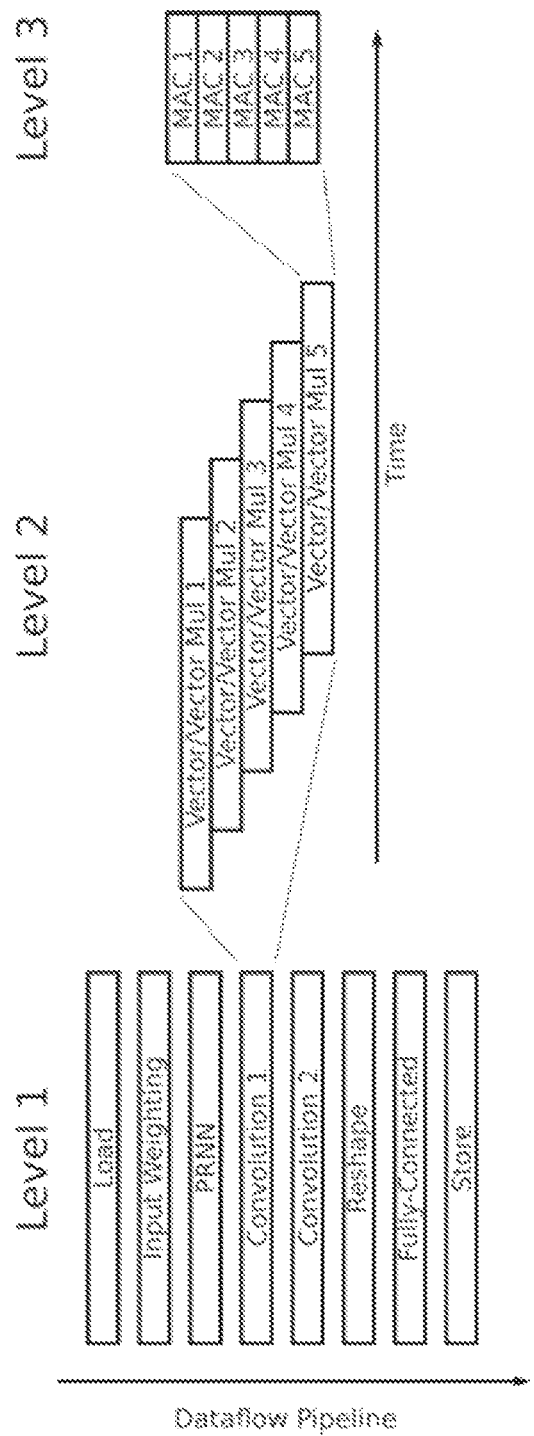
FIG. 12 is a diagram showing the design hierarchy for a FPGA implementation of the PRNN-CNN classifier.

The FPGA design is organized in the three-level hierarchy shown in FIG. 12. The first level consists of a series of stages within an HLS Dataflow pipeline. Each stage corresponds to a layer of the classifier, and a series of independent classifications pass through this pipeline, with an initiation interval corresponding to the latency of the slowest stage.

At the next level of abstraction, the operations within each stage are organized as a conventional HLS Pipeline. The execution path of each pipeline typically corresponds to a single vector-vector multiplication. A layer may be divided into a series of operationally identical such vector multiplications that progress through the pipelined execution path with a typical initiation interval of one cycle. (Read-after-write dependencies within the PRNN pipeline restrict the initiation interval to 16 cycles.)

At the final level, the execution path of each layer may be divided at points into parallel paths executed simultaneously. These parallel paths, consisting of individual multiply-accumulate (MAC) operations, allow for better utilization of the available digital signal processing resources and better minimization of overall latency.

After constructing the PRNN-CNN with trained parameters on the PYNQ-Z1, RF fingerprinting was implemented on the test dataset. The model reached 95.90% accuracy. There was only a 0.42% decrease for the FPGA implementation due to slight additional sources of imprecision. Note that when a confusion matrix is used to compare predicted labels to ground truth labels, component $M_{ij}$ represents the ratio between the output prediction and ground truth label, i.e., $M_{ij}=N_i^{pre}/N_j^{tar}$, where $N_i^{pre}$ is the number of predictions for the i-th device, and $N_j^{tar}$ is the number of transmissions for the j-th device.

Figure 4:
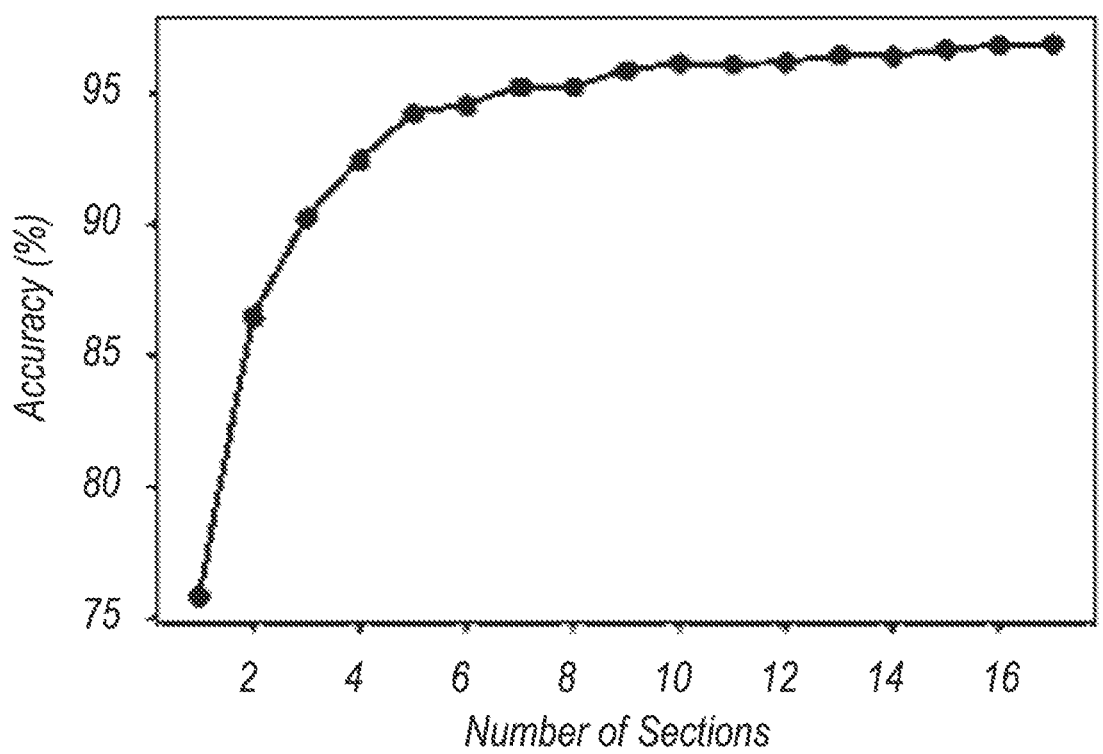
FIG. 4 is a graph showing results on a test dataset when the number of data units, N, used to classify a transmission increases from 1 to 17.

As will be understood, there is a trade-off between accuracy and throughput. Maximum accuracy requires that all 17 segments of a transmission be used, but using only 8 segments still allows for a high level of accuracy, nearly 94%, while more than doubling the throughput due to the reduction in calculation per classification required. The precise relationship between number of segments and accuracy are shown in FIG. 4.

Performance Analysis

Table 6, below, shows the performance estimations for FPGA implementations of the NRL and PRNN-CNN classifiers. Both classifiers are built with the same hierarchical design principles, but the NRL network could not be implemented on the PYNQ-Z1 board due to insufficient available memory to hold the parameters and intermediate data representations. In order to estimate energy per classification, consumption was assumed to scale linearly with the number of multiply-accumulate (MAC) operations per inference, with 170 pJ per MAC assumed for an energy-efficient FPGA. Latency and throughput estimates are derived directly from Vivado HLS compilation reports.

TABLE 6

(Estimated NRL and PRNN-CNN classifier performance results on per-classification basis. Timing results for the PRNN-CNN confirmed experimentally.)

| Metric | NRL Model | PRNN-CNN Model | Improvement Factor |
| --- | --- | --- | --- |
| Energy (μJ) | 6,194 | 15 | 413 |
| Latency (μs) | 26,190 | 219 | 119 |
| Throughput (1/s) | 50 | 12,192 | 244 |

Figure 13:
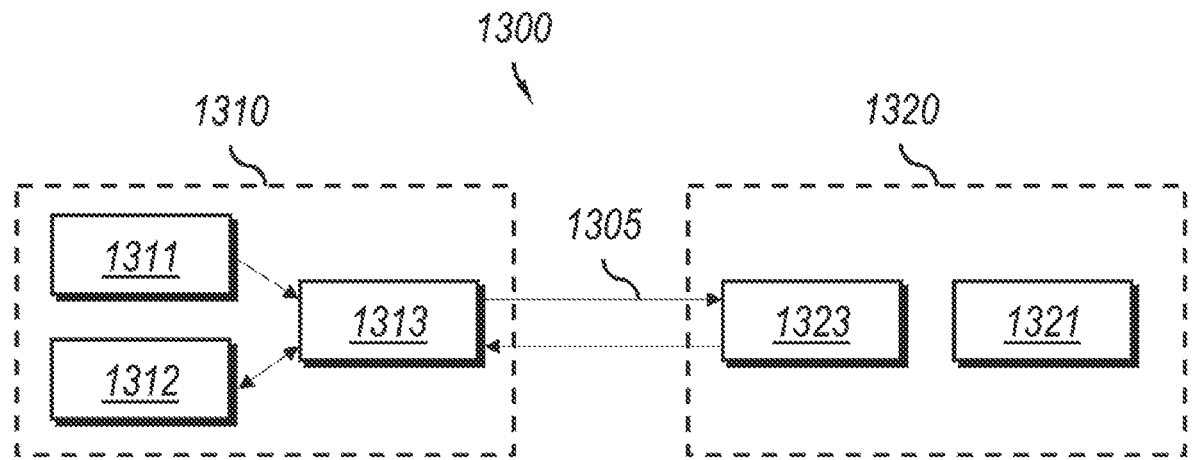
FIG. 13 is a block diagram of a real-time test setup.

In order to confirm the timing behavior of the system, the PRNN-CNN model was implemented on the PYNQ-Z1 and evaluated experimentally in a real-time test. Referring to FIG. 13, a real-time test setup 1300 can be seen. As shown, A remote computer 1310 included a test dataset 1311 and a control display 1312. Randomly selected radio frequency data segments 1305 were streamed from via ethernet connections 1313, 1323 from the remote computer to a FPGA implementation 1321 on a FPGA board 1320, which processed them in real time. A response 1306 was sent back to the remote computer, where it could be viewed, e.g., on the control display. The measured timing showed negligible deviation from the estimated values.

The reduction in size and simplification of the PRNN-CNN network with respect to the NRL network allows for a 413-times reduction in power consumption, a 119-times reduction in latency, and a 244-times increase in throughput based on the estimated parameters. Latency reduction and throughput maximization are key to enabling real-time processing, as both must fall within context-dependent thresholds to prevent data queuing and to enable fast response. Improvement in these metrics allows real-time RF fingerprinting to be expanded to environments necessitating very fast response to large-bandwidth RF data.

Figure 14:
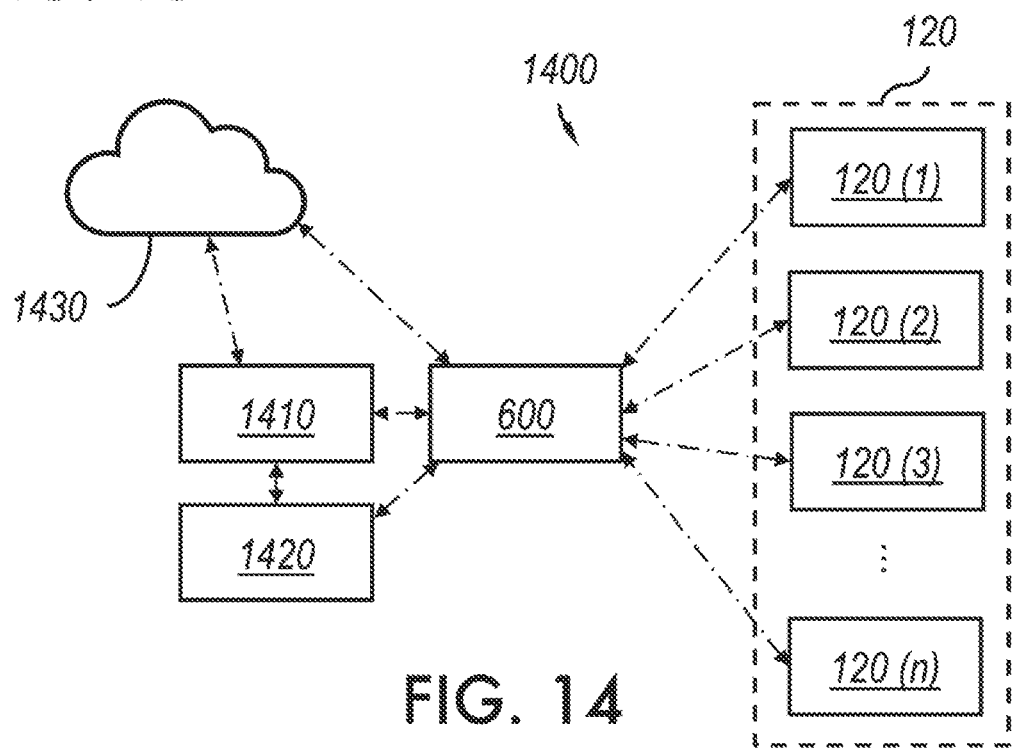
FIG. 14 is a block diagram of a system.

In some embodiments, a system may be provided. Referring to FIG. 14, in some embodiments, the system 1400 may include an on-chip photonic RNN 600 operably communicating with a plurality of remote devices 120, including, e.g., a first device 120(1), a second device 120(2), a third device 120(3), and an n-th device 120(n). The system may include a processor 1410. The processor 1410 may be operably coupled to the on-chip photonic RNN. The system may include a non-transitory computer-readable storage medium 1420. The non-transitory computer-readable storage medium may be operably coupled to the processor 1410 and/or the on-chip photonic RNN 600.

In some embodiments, the processor 1410 and/or the on-chip photonic RNN 600 may be configured to communicate with a remote processor, such as a cloud-based server 1430.

While the invention is described through the above-described exemplary embodiments, modifications to, and variations of, the illustrated embodiments may be made without departing from the inventive concepts disclosed herein. For example, although specific parameter values, such as dimensions and materials, may be recited in relation to disclosed embodiments, within the scope of the invention, the values of all parameters may vary over wide ranges to suit different applications.

As used herein, including in the claims, the term "and/or," used in connection with a list of items, means one or more of the items in the list, i.e., at least one of the items in the list, but not necessarily all the items in the list. As used herein, including in the claims, the term "or," used in connection with a list of items, means one or more of the items in the list, i.e., at least one of the items in the list, but not necessarily all the items in the list. "Or" does not mean "exclusive or."

Disclosed aspects, or portions thereof, may be combined in ways not listed above and/or not explicitly claimed. In addition, embodiments disclosed herein may be suitably practiced, absent any element that is not specifically disclosed herein. Accordingly, the invention should not be viewed as being limited to the disclosed embodiments.

What is claimed is:

1. A method for real-time radio frequency (RF) fingerprinting, comprising:
    capturing a plurality of RF transmissions from a plurality of devices, each transmission comprising a plurality of adjacent data units;
    obtaining residual data from each transmission via residual data preprocessing, wherein the residual data preprocessing comprises:
        identifying separate packet transmissions by thresholding the amplitude difference of the adjacent samples;
        aligning the beginning of each separate packet transmission with a fixed preamble, and identifying a packet transmission start and end;
        calculating a phase difference between a ground truth signal and a measured signal, beginning with the fixed preamble;
        running linear regression to identify a phase and frequency correction;
        decoding the transmission into a data bit stream using the phase and frequency correction;
        regenerating a ground truth signal using the decoded data bit stream
        applying a frequency and phase offset to derive a reference; and
        obtaining residual data by subtracting the captured transmission from the regenerated ground truth signal;
    processing at least a portion of the residual data using a photonic hardware-compatible continuous-time recurrent neural network (CTRNN) model to correlate temporal information and generate informative features; and
    classifying the residual data based on the informative features using a convolutional neural network (CNN) model, and outputting a prediction of which of the plurality of devices at least one of the plurality of adjacent data units was transmitted from, the CNN model configured to:
        convolute the generated informative features using at least one convolution-1D layer;
        for each convolution-1D layer, select a maximum value for every two consecutive sequential points output from the convolution-1D layer using a max-pooling layer;
        flatten and fully connect the output from a last max-pooling layer using a fully-connected layer; and
        classify, based on the output from the fully-connected layer, which of the plurality of devices at least one of the plurality adjacent data units was transmitted from.

2. The method according to claim 1, wherein a signal-to-noise ratio of the captured transmission is greater than 15 dB.

3. The method according to claim 2, further comprising cancelling noise in the captured transmission prior to residual data preprocessing.

4. The method according to claim 3, wherein the CTRNN model is trained end-to-end with the convolution-1D layer, the max-pooling layer, and the fully-connected layer, using a back propagation through time (BPTT) algorithm.

5. The method according to claim 4, wherein the CTRNN model is implemented on a photonic RNN, which comprises silicon modulator neurons and N-doped silicon micro-ring weights banks in a recurrent loop.

6. The method according to claim 5, wherein the CNN model is implemented using a field programmable gate array (FPGA).

7. An on-chip photonic recurrent neural network (RNN) for real-time radio frequency fingerprinting, comprising:
    an antenna connected to a software-defined-radio (SDR), the SDR configured to demodulate RF data received by the antenna, the SDR also configure to perform residual data processing to reshape and weight residual data from the demodulated RF data;
    an input/output portion connected to the SDR, the input/output portion, comprising:
        a digital-to-audio converter (DAC) and Mach-Zehnder Modulator (MZM) to convert output from the SDR to analog signal and modulate to an optical domain; and
        a wavelength division multiplexer (WDM) configured to couple the output from the DAC and MZM to grating couplers via a v-groove fiber array;
    a photonic RNN, which comprises silicon modulator neurons and N-doped silicon micro-ring weights banks in a recurrent loop, the photonic RNN configured to receive output from the v-groove fiber array, correlate temporal information, and generate informative features;
    wavelength selective switches (WSS) configured to demultiplex output from the photonic RNN;
    an analog-to-digital converter (ADC) that converts the demultiplexed output to a digital output;
    a field programmable gate array (FPGA) configured to receive the digital output, and classify the residual data based on the informative features using a convolutional neural network (CNN) model.

8. A system, comprising:
   an on-chip photonic recurrent neural network (RNN) according to claim 7; and
   a plurality of remote device operably communicating with the on-chip photonic RNN.

9. The system according to claim 8, further comprising a non-transitory computer-readable storage medium operably coupled to the on-chip photonic RNN.

10. The system according to claim 8, further comprising a processor operably coupled to the on-chip photonic RNN.

11. The system according to claim 10, wherein the on-chip photonic RNN and/or the processor is configured to communicate with a remote processor.

* * * * *